(12) United States Patent
Moorlag et al.

(10) Patent No.: US 7,732,029 B1
(45) Date of Patent: Jun. 8, 2010

(54) COMPOSITIONS OF CARBON NANOTUBES (75) Inventors: Carolyn Patricia Moorlag, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 110 days.

(21) Appl. No.: 11/615,316

(22) Filed: Dec. 22, 2006

(51) Int. Cl.
*B29C 47/00* (2006.01)
*B32B 27/00* (2006.01)
*G03G 15/20* (2006.01)

(52) U.S. Cl. .................. 428/36.9; 428/421; 428/422; 399/320

(58) Field of Classification Search ............... 428/36.9, 428/421, 422; 399/320
See application file for complete search history.

(56) References Cited

U.S. PATENT DOCUMENTS

| | | | |
|---|---|---|---|
| 4,257,699 A | 3/1981 | Lentz | |
| 4,264,181 A | 4/1981 | Lentz et al. | |
| 4,272,179 A | 6/1981 | Seanor | |
| 5,017,432 A | 5/1991 | Eddy et al. | |
| 5,061,965 A | 10/1991 | Ferguson et al. | |
| 5,370,931 A | 12/1994 | Fratangelo et al. | |
| 5,501,881 A | 3/1996 | Fuller et al. | |
| 5,512,409 A | 4/1996 | Henry et al. | |
| 5,679,463 A | 10/1997 | Visser et al. | |
| 5,729,813 A | 3/1998 | Eddy et al. | |
| 5,935,712 A | 8/1999 | Tan et al. | |
| 5,998,033 A | 12/1999 | Tan et al. | |
| 6,007,657 A | 12/1999 | Eddy et al. | |
| 6,090,491 A | 7/2000 | Tan et al. | |
| 6,114,041 A | 9/2000 | Tan et al. | |
| 6,159,588 A | 12/2000 | Eddy et al. | |
| 6,395,444 B1 | 5/2002 | Riehle et al. | |
| 6,555,181 B1 | 4/2003 | Santos et al. | |
| 6,953,653 B2 | 10/2005 | Smith et al. | |
| 7,019,079 B2 | 3/2006 | Sumi et al. | |
| 7,127,205 B2 | 10/2006 | Gervasi et al. | |
| 2002/0161101 A1 | 10/2002 | Carroll et al. | |
| 2004/0071624 A1* | 4/2004 | Tour et al. | 423/447.1 |
| 2004/0185271 A1* | 9/2004 | Kaplan et al. | 428/447 |
| 2005/0179355 A1 | 8/2005 | Yoo et al. | |

(Continued)

FOREIGN PATENT DOCUMENTS

DE 112005002584 T5 9/2007

(Continued)

OTHER PUBLICATIONS

Georgakilas et al. "Organic Functionalization of Carbon Nanotubes" J. Am. Chem. Soc., 2002, 124(5), 760-761; Jan. 8, 2002.*

(Continued)

*Primary Examiner*—Rena L Dye
*Assistant Examiner*—James Yager
(74) *Attorney, Agent, or Firm*—Pepper Hamilton LLP (57) ABSTRACT

A coating composition may include a fluoropolymer; a plurality of carbon nanotubes, wherein the carbon nanotubes are substantially non-agglomerated and substantially uniformly dispersed in the fluoropolymer; and a coupling agent. The coupling agent may include a first functional group, a second functional group, and a linking group. The first functional group may be bonded to the carbon nanotubes. The second functional group may be bonded to the fluoropolymer. The linking group may bond the first functional group to the second functional group.

13 Claims, 5 Drawing Sheets

U.S. PATENT DOCUMENTS

2007/0037918 A1    2/2007   Keigo

FOREIGN PATENT DOCUMENTS

| EP | 1738898 A | | 1/2007 |
|---|---|---|---|
| WO | 03007314 A | | 1/2003 |
| WO | WO2005012171 | * | 2/2005 |
| WO | WO2005014708 | * | 2/2005 |
| WO | 2005042636 A | | 5/2005 |
| WO | 2006046727 A | | 5/2006 |

OTHER PUBLICATIONS

Holzinger et al.; [2+1] cycloaddition for cross-linking SWCNTs; 2004; Carbon; vol. 42; p. 941-947.*

Maggini et al.; Addition of Azomethine Ylides to C.sub.60: Synthesis, Characterization, and Functionalization of Fullerene Pyrollidines; 1993; J. Am. Chem. Soc.; vol. 115; p. 9798-9799.* http://www.fibrils.com/PDFs/Recommedations%20for%20letting%20down%20MBs.pdf; Recommendations for Letting Down Nanotube Masterbatches; printed Dec. 21, 2006; 2 pp.

http://www.rsc.org/delivery/_ArticleLinking/DisplayHTML Articleforfree.cfm?JournalCode=...; Utilizing Polymers for Shaping the Interfacial Behavior of Carbon Nanotubes; printed Nov. 15, 2006: 10 pp.

Carroll, D.L., "Carbon Nanotube—Fluoropolymer Nanocomposites for Applications in EAP Actuators and Pyroelectric Detection", Symposium N: Nano and Micro-Composite, Jun. 18-21, 2002, European Materials Research Society, E-MRS Spring Meeting 2002, Stratsbourg, France, 2 pp.

Maggini, Michele, et al., "Addition of Azomethine Ylides to C60: Synthesis, Characterization, and Functionalization of Fullerene Pyrrolidines", Journal of the American Chemical Society, 1993, vol. 115, No. 21, pp. 9798-9799.

Banks et al. "Organofluorine Chemistry Principles and Commercial Applications", 1994, pp. 380-382, Plenum Press, New York and London.

Zhang, "1,3-Dipolar Cycloadditon Reactions of Azomethine Ylides", Department of Chemistry University of Georgia, Chemistry Building Organic Seminar, Apr. 27, 2006.

* cited by examiner

COMPOSITIONS OF CARBON NANOTUBES

CROSS-REFERENCE TO RELATED APPLICATIONS

Not applicable.

STATEMENT REGARDING FEDERAL SPONSORED RESEARCH

Not applicable.

NAMES OF PARTIES TO A JOINT RESEARCH AGREEMENT

Not applicable.

SEQUENCE LISTING

Not applicable.

BACKGROUND

1. Technical Field

The disclosed embodiments generally relate to the field of coatings. In particular, this disclosure relates to coatings as those that may be useful for applying a top layer coating onto a fuser roll used in printing and copying operations. The top layer coating includes a carbon nanotube reinforced fluoropolymer composite of substantially uniform dispersion, where the carbon nanotubes are chemically bonded with the fluoropolymer.

2. Description of the Related Art

In a typical electrostatographic printing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be a photosensitive member itself or other support sheet such as plain paper.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, thermoplastic resin particles are fused to the substrate by heating to a temperature of between about 90° C. to about 160° C. or higher depending upon the softening range of the particular resin used in the toner. It is not desirable, however, to raise the temperature of the substrate substantially higher than about 200° C. because of the tendency of the substrate to discolor at such elevated temperatures, particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time is provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation to the hot offset temperature is a measure of the release property of the fuser roll, and accordingly it is desired to provide a fusing surface, which has a low surfaced energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

Fuser and fixing rolls may be prepared by applying one or more layers to a suitable substrate. Cylindrical fuser and fixer rolls, for example, may be prepared by applying an elastomer or fluoroelastomer to an aluminum cylinder. The coated roll is heated to cure the elastomer. Such processing is disclosed, for example, in U.S. Pat. Nos. 5,501,881; 5,512,409; and 5,729,813; the disclosure of each of which is incorporated by reference herein in their entirety.

Fusing systems using fluoroelastomers as surfaces for fuser members are described in U.S. Pat. Nos. 4,264,181; 4,257,699; 4,272,179; and 5,061,965; the disclosure of each of which is incorporated by reference herein in their entirety.

U.S. Pat. No. 5,017,432, which is incorporated by reference herein in its entirety, describes a fusing surface layer obtained from a specific fluoroelastomer, poly(vinylidenefluoride-hexafluoropropylene-tetrafluoroethylene) where the vinylidenefluoride is present in an amount of less than 40 weight percent. This patent further discloses curing the fluoroelastomer with Viton® Curative No. 50 (VC-50) available from E. I. du Pont de Nemours, Inc., which is soluble in a solvent solution of the polymer at low base levels and is readily available at the reactive sites for cross-linking. This patent also discloses use of a metal oxide (such as cupric oxide) in addition to VC-50 for curing.

U.S. Pat. No. 7,127,205, which is incorporated in its entirety herein, provides a process for providing an elastomer surface on a fusing system member. Generally, the process includes forming a solvent solution/dispersion by mixing a fluoroelastomer dissolved in a solvent such as methyl ethyl ketone and methyl isobutyl ketone, a dehydrofluorinating agent such as a base, for example the basic metal oxides, MgO and/or $Ca(OH)_2$, and a nucleophilic curing agent such as VC-50 which incorporates an accelerator and a cross-linking agent, and coating the solvent solution/dispersion onto the substrate. The surface is then stepwise heat cured. Prior to the stepwise heat curing, ball milling is usually performed, for from 2 to 24 hours.

Cross-linked fluoropolymers form elastomers, or fluoroelastomers, are chemically stable and exhibit good release properties. They also relatively soft and display elastic properties. Fillers are often used as in polymer formulations as reinforcing particles to improve the polymer formulation hardness and wear resistance. Thermal conductivity of the fuser system is also important because the fuser or fixer must adequately conduct heat to soften the toner particles for fusing. In order to increase the thermal conductivity of the fuser or fixer member, thermally conductive particles, such as metal oxide particles have been used as fillers. In order to provide high thermal conductivity, the loading of the filler must be high. Loading of a filler that is too high, however, leads to coatings that are too hard, brittle, and more prone to wear. The addition of fillers of conventional metal oxides, such as aluminum, iron, copper, tin and zinc oxides are disclosed in U.S. Pat. Nos. 6,395,444; 6,159,588; 6,114,041; 6,090,491; 6,007,657; 5,998,033; 5,935,712; 5,679,463; and 5,729,813; each of which is incorporated by reference herein in their entirety. Metal oxide fillers, at loadings of up to about 60 wt %, provide thermal conductivities from about 0.2 to about 1.0 $Wm^{-1}K^{1-}$. However, the increased loading adversely affects the wear and lifetime of the fuser.

A more mechanically robust coating is required for new generation fusing systems in order to improve lifetime and diminish the occurrence of roll failure due to edge wear. Higher thermal conductivity of the top layer would improve heat retention at the surface during fusing, and electrical conductivity would dissipate any static charge buildup.

The disclosure contained herein describes attempts to address one or more of the problems described above.

SUMMARY

A coating or coating composition may include a fluoropolymer; a plurality of carbon nanotubes, wherein the carbon nanotubes are substantially non-agglomerated and substantially uniformly dispersed in the fluoropolymer; and a coupling agent. The coupling agent may include a first functional group, a second functional group, and a linking group. The first functional group may be bonded to the carbon nanotubes. The second functional group may be bonded to the fluoropolymer. The linking group may bond the first functional group to the second functional group.

In other embodiments, the first functional group may be chemically bonded to the carbon nanotubes; the second functional group may be chemically bonded to the fluoropolymer; and the linking group may chemically bond the first functional group to the second functional group.

In some embodiments, the fluoropolymer may include a monomeric repeat unit that is selected from the group consisting of vinylidene fluoride, hexafluoropropylene, tetrafluoroethylene, perfluoro(methyl vinyl ether), and mixtures thereof.

In further embodiments, the carbon nanotubes may be selected from the group consisting of single wall carbon nanotubes, multi-wall carbon nanotubes, carbon nanofibers, and mixtures thereof. In still further embodiments, the carbon nanotubes may have a diameter less than 100 nanometers. Exemplary embodiment include those where the carbon nanotubes may be present in an amount of from about 0.5 to about 20 percent by weight of coating composition.

In some embodiment of a coating or coating composition, the first functional group may be selected from the group consisting of carbene, free radical, nitrene, aziridine, azomethine ylide, aryl diazonium cation, oxazolidinone, and mixtures thereof.

In further embodiments, the second functional group may be selected from the group consisting of phenol, amine, olefin, and mixtures thereof.

Yet in further embodiments, the linking group may be selected from the group consisting of a linear aromatic hydrocarbon group having from about 6 to about 60 carbons, a branched aromatic hydrocarbon group having from about 6 to about 60 carbons, a linear aliphatic hydrocarbon group having from about 1 to about 30 carbons, a branched aliphatic hydrocarbon group having from about 1 to about 30 carbons, a heteroatom, and mixtures thereof.

Still in further embodiments, a coating composition may include an effective fluoropolymer cross-linking agent.

Embodiments herein include a coated fusing member or fuser. A coated fusing member may include a fusing member substrate, and a fluoropolymer or fluoroelastomer coating as an outermost coating layer on the substrate. A fluoropolymer coating may include a plurality of carbon nanotubes, wherein the carbon nanotubes are substantially non-agglomerated and substantially uniformly dispersed in the fluoropolymer, and a coupling agent. A coupling agent of a coated fusing member may include a first functional group, a second functional group, and a linking group. The first functional group of a coated fuser may be chemically bonded to the carbon nanotubes. The second functional group may be chemically bonded to the fluoropolymer. In embodiments, the linking group may chemically bond the first functional group to the second functional group.

In some embodiments of a coated fusing member, the fluoroelastomer may include a monomeric repeat unit that is selected from the group consisting of vinylidene fluoride, hexafluoropropylene, tetrafluoroethylene, perfluoro(methyl vinyl ether), and mixtures thereof. In still other embodiments, the coated fusing member may have a fluoropolymer that may include a copolymer of vinylidene fluoride with another monomer selected from the group consisting with another monomer selected from the group consisting of hexafluoropropylene, tetrafluoroethyelene, and mixtures thereof. In some embodiments of a coated fusing member, the fluoropolymer may have more than 60% of fluorine content.

In exemplary embodiments, a coated fusing may include carbon nanotubes that are selected from the group consisting of single wall carbon nanotubes, multi-wall carbon nanotubes, carbon nanofibers, and mixtures thereof. In some embodiments of a coated fusing member, the carbon nanotubes may have a diameter less than 100 nanometers. In further embodiments of a coated fusing member the carbon nanotubes may be present in an amount of from about 0.5 to about 20 percent by weight of coating composition. In still other embodiments, a coated fusing member may include carbon nanotubes present in an amount of from about 1 to about 10 percent by weight of coating composition.

Exemplary embodiments of a fusing member include those where the first functional group may be selected from the group consisting of carbene, free radical, nitrene, aziridine, azomethine glide, aryl diazonium cation, oxazolidinone, and mixtures thereof.

In further exemplary embodiments of a fusing member, the second functional group may be selected from the group consisting of phenol, amine, olefin, and mixtures thereof.

In still further exemplary embodiments of a fusing member, a linking group may selected from the group consisting of a linear aromatic hydrocarbon group having from about 6 to about 60 carbons, a branched aromatic hydrocarbon group having from about 6 to about 60 carbons, a linear aliphatic hydrocarbon group having from about 1 to about 30 carbons, a branched aliphatic hydrocarbon group having from about 1 to about 30 carbons, a heteroatom, and mixtures thereof. In still other embodiments, a coated fusing member may include a linking group that is a hydrocarbon group containing a siloxane group.

In embodiments, a coated fusing member may include an effective fluoropolymer cross-linking agent, and in embodiments, the fluoropolymer coating may be a cross-linked fluoroelastomer.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Embodiments herein disclose and claim a composite composition of fluoropolymers displaying good chemical and thermal stability and low surface energy. Cross-linked fluoropolymers form elastomers that are relatively soft and display elastic properties. The fluoropolymer used for coating fuser rolls may be Viton-GF® (E. I. du Pont de Nemours, Inc.), comprised of tetrafluoroethylene (TFE), hexafluoropropylene (HFP), vinylidene fluoride (VF2), and a brominated peroxide cure site.

Fillers are often used in polymer formulations as reinforcing particles to improve the hardness and wear resistance. Examples of fillers include spherical particles such as metal oxides or carbon black, carbon fibers, and carbon nanotubes. Carbon nanotubes (CNTs) are nanoscale in size and have a high aspect ratio, so that loading may be lowered to obtain significantly improved mechanical properties versus incorporating larger spherical particles, such as carbon black. Carbon nanotubes are also electrically and thermally conductive, and can impart these properties into a composite material.

U.S. patent application Ser. No. 11/167,158, which is incorporated by reference herein in its entirety, was filed for the incorporation of carbon nanotubes into elastomers for improvements of coatings for fusing applications, including a fluoropolymer/CNT composite material wherein interactions between the fluoropolymer and the CNTs would be via incidental surface interactions. Embodiments herein, disclose and claim a composite coating composition including: 1) any fluoropolymer, 2) single- or multi-walled carbon nanotubes or carbon nanofibers, and 3) a suitable multifunctional linker group or coupling agent that bonds directly to the both the fluoropolymer chains and to carbon nanotubes.

Figure 1:
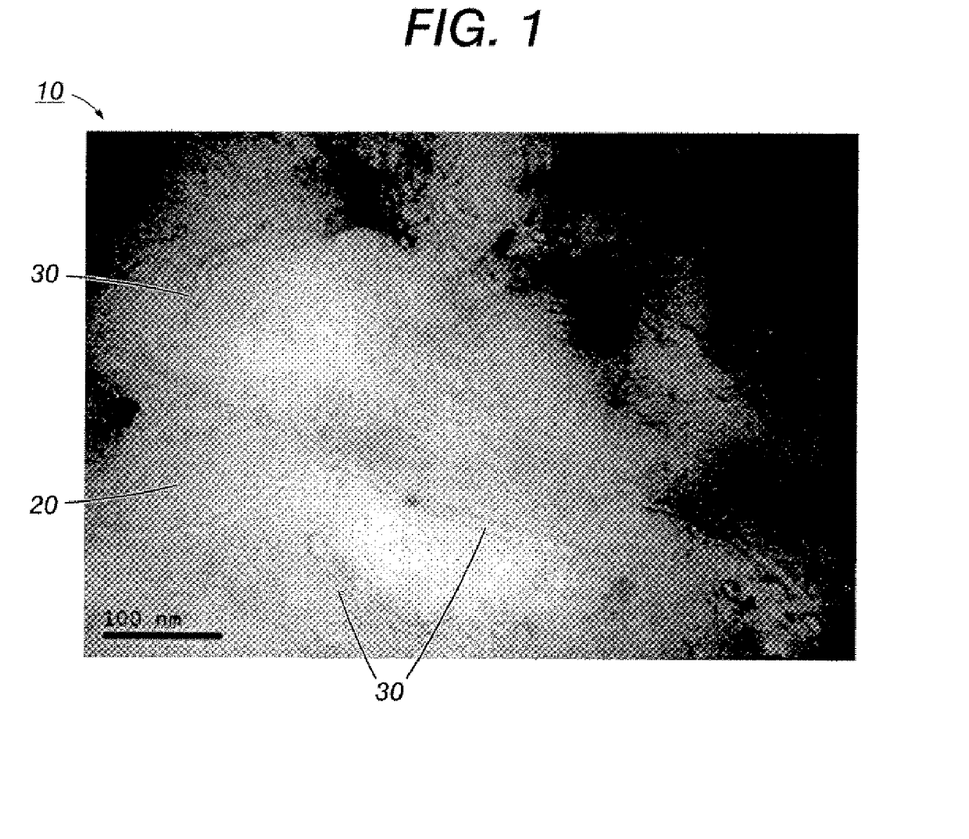
FIG. 1 is a transmission electron micrograph of a fluoropolymer coating containing substantially non-agglomerated and substantial uniformly dispersed carbon nanotubes with a coupling agent bonding the fluoropolymers and nanotubes.

Referring to FIG. 1, a transmission electron micrograph of a coating composition embodiment of a coating on a substrate 10 is presented. In an embodiment, a coating on a substrate 10 comprises a fluoropolymer matrix 20. The coating may further comprise a plurality of carbon nanotubes (CNTs) 30. The carbon nanotubes 30 are substantially non-agglomerated and substantially uniformly dispersed in the fluoropolymer. In exemplary embodiments the coating 10 further comprises a coupling agent (not shown in FIG. 1). The coupling agent may comprise a first functional group, a second functional group, and a linking group; wherein the first functional group is bonded to the carbon nanotubes 30; wherein the second functional group is bonded to the fluoropolymer 20; and wherein the linking group bonds the first functional group to the second functional group.

In another embodiment of a coating 10, the first functional group may be chemically bonded to the carbon nanotubes, the second functional group may be chemically bonded to the fluoropolymer, and the linking group may chemically bond the first functional group to the second functional group. Details of the coupling agents and functional groups are presented infra.

In an embodiment, the coating 10 may comprise a fluoropolymer which has a monomeric repeat unit that is selected from the group consisting of vinylidene fluoride, hexafluoropropylene, tetrafluoroethylene, perfluoro(methyl vinyl ether), and mixtures thereof. In another embodiment, the fluoropolymer is comprised of a poly(vinylidene fluoride), or a copolymer of vinylidene fluoride with another monomer. For example, the fluoropolymer is a copolymer of vinylidene fluoride with another monomer selected from the group consisting of hexafluoropropylene, tetrafluoroethyelene, and a mixture thereof.

Embodiments of fluoropolymers herein may include the Viton® fluoropolymers from E. I. du Pont de Nemours, Inc. Viton® fluoropolymers include for example: Viton®-A, copolymers of hexafluoropropylene (HFP) and vinylidene fluoride (VDF or VF2), Viton®-B, terpolymers of tetrafluoroethylene (TFE), vinylidene fluoride (VDF) and hexafluoropropylene (HFP); and Viton®-GF, tetrapolymers composed of TFE, VF2, HFP, and small amounts of a cure site monomer.

The CNTs dispersed in the fluoropolymer are an example of a solid-solid dispersion. A dispersion is a two-phase system where one phase consists of finely divided particles, often in the colloidal size range, distributed throughout a bulk substance, the particles being the dispersed or internal phase, and the bulk substance the continuous phase. (*Hawley's Condensed Chemical Dictionary*, 14$^{th}$ Ed, Rev. by R. J. Lewis, Sr., John Wiley & Sons, Inc., New York (2001) p. 415).

In embodiments, the composite coating may contain about 0.1% to about 40% (w/w) of CNT in a fluoropolymer. Other embodiments use about 0.5% to about 20% (w/w) of CNT in fluoropolymer. Preferred embodiments use about 1% to about 10% (w/w).

Carbon nanotubes (CNTs) are an allotrope of carbon. They take the form of cylindrical carbon molecules and have novel properties that make them useful in a wide variety of applications in nanotechnology, electronics, optics and other fields of materials science. They exhibit extraordinary strength and unique electrical properties, and are efficient conductors of heat. Carbon nanofibers are similar to carbon nanotubes in dimension and they are cylindric structures, but they are not perfect cylinders, as are CNTs. Carbon nanofibers are within the scope of embodiments herein.

Nanotubes are members of the fullerene structural family, which also includes buckyballs. Whereas buckyballs are spherical in shape, a nanotube is cylindrical. The diameter of a nanotube is on the order of a few nanometers, while they can be up to several millimeters in length. There are two main types of nanotubes: single-walled nanotubes (SWNTs) and multi-walled nanotubes (MWNTs) both of which are encompassed in embodiments herein. In embodiments of the coating, the carbon nanotubes may be selected from single-walled nanotubes (SWNTs), multi walled nanotubes (MWNTs), carbon nanofibers, and mixtures thereof. In embodiments, the carbon nanotubes may have a diameter less than 100 nanometers. In embodiments, the carbon nanotubes may be present in an amount of from about 0.5 to about 20 percent by weight of coating composition Coupling agents of embodiments herein may be multifunctional coupling agents, wherein the functional groups on the coupling agent bond with the CNTs and the fluoropolymer matrix. Exemplary embodiments of coupling agents may encompass chemical coupling agents, where functional groups on the chemical coupling agent form chemical bonds with the CNTs and the fluoropolymer matrix.

Figure 2:
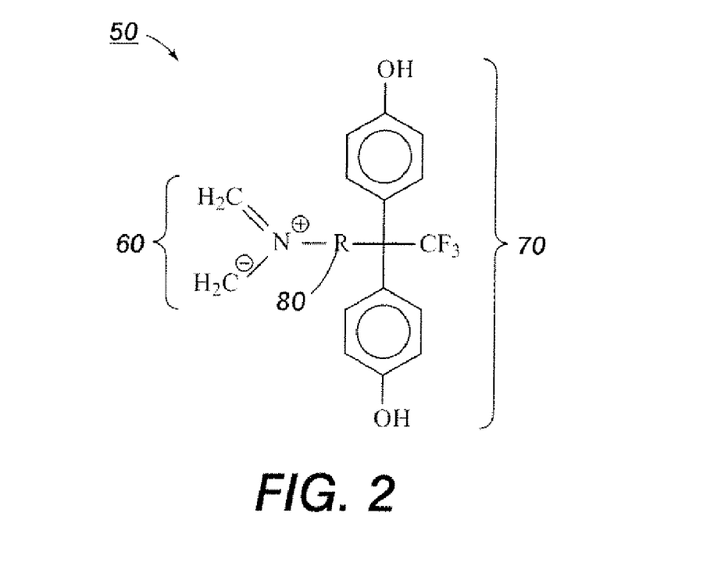
FIG. 2 is a chemical structure of an embodiment of a coupling agent or linker herein.

A non-limiting example of a coupling agent of embodiments herein is presented in FIG. 2. The coupling agent 50 of FIG. 2 may comprise a first functional group 60, wherein the first functional group is selected to interact or bond with CNT surfaces. The coupling agent may further comprise a second functional group 70, wherein the second functional group may be selected to interact or bond with the fluoropolymer chains in a fashion analogous to the reactions of fluoropolymer cross-linking agents with certain fluoropolymer chains. The coupling agents of embodiments herein further may include a linking group 80. The linking group 80 connects first functional group 60 with the second functional group 70 of the coupling agent 50.

The exemplary coupling agent 50 of FIG. 2 may be considered a multifunctional chemical coupling agent. The first functional group 60 of the coupling agent 50 in FIG. 2 is an example of an azomethine ylide, which is capable of chemically reacting with the rings on the outside graphene surfaces of carbon nanotubes. The second functional group 70 depicted in FIG. 2 comprises a bisphenol group, which is capable of chemically reacting with unsaturated monomers present on certain fluoropolymers. The linking group 80, represented by the letter "R" comprises stable chemical bonds that chemically link the first functional group 60 to the second functional group 70. Examples and more details of embodiments of each of these groups of a chemical coupling agent 50 are presented infra.

In general strong chemical bonding is associated with the sharing or transfer of electrons between participating atoms. Generally covalent and ionic bonds are described as strong, whereas hydrogen bonds and van der Walls are considered weaker. It should be noted, however that while chemical bond formation between the coupling agent, the CNTs and the fluoropolymer are exemplary, the embodiments herein are not to be limited to covalent and ionic bond formation. Other stable bonding mechanisms that are effective in bonding or linking the CNTs, the coupling agent, and the fluoropolymer together, such as but not limited to, hydrogen bonding and dispersion forces are within the scope of embodiments herein.

Figure 3:
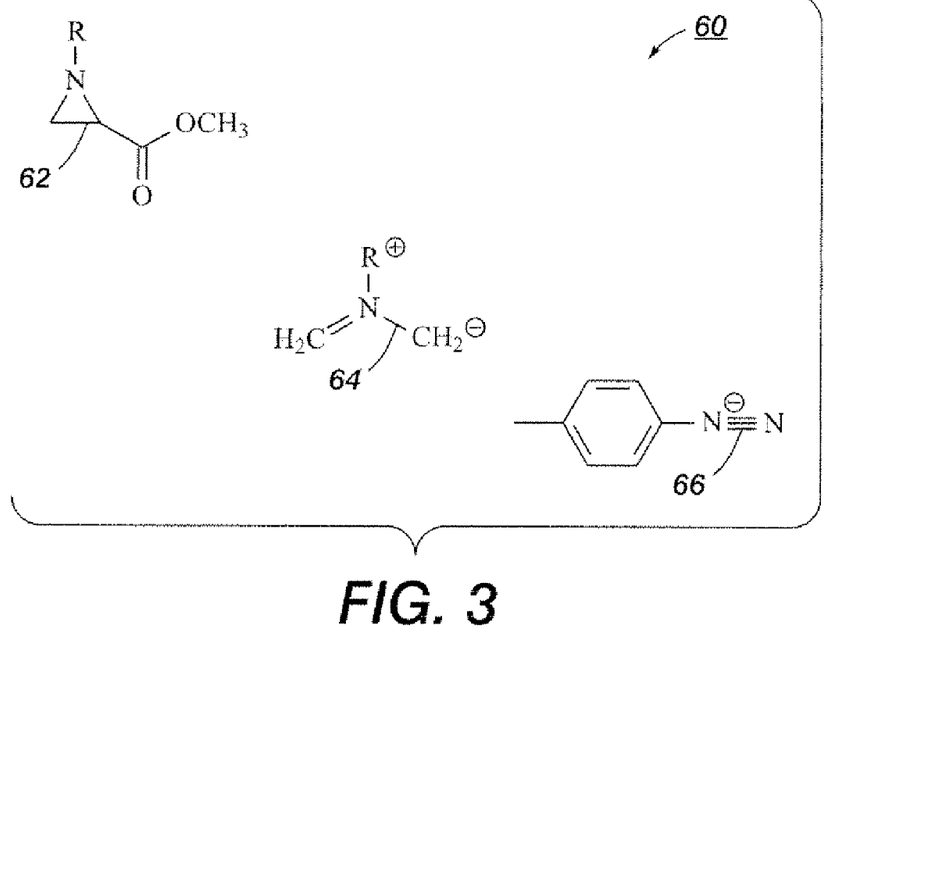
FIG. 3 are chemical structures of illustrative first functional groups of embodiments of coupling agents herein.

Referring now to FIGS. 2 and 3, other embodiments of a coating may comprise first functional groups 60 of aziridine rings 62, ylides 64, and diazonium compounds 66. In another embodiment the first functional group 60 may be selected from the group consisting of carbine, free radical, nitrene, aziridine, azomethine ylide, aryl diazonium cation, oxazolidinone, and mixtures thereof.

Figure 4:
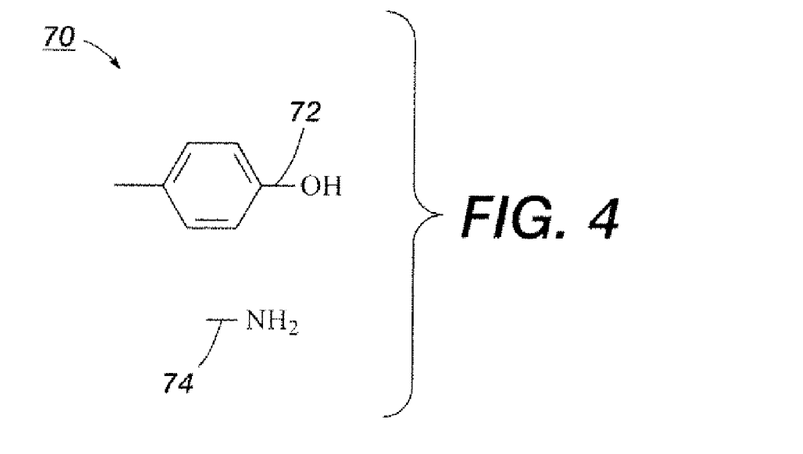
FIG. 4 are chemical structures of illustrative second functional groups of embodiments of coupling agents herein.

Referring now to FIGS. 2 and 4, in still other embodiments of a coating, a second functional group 70 may be selected from the group consisting of phenol 72 and amine 74. In yet another embodiment a second functional group may be selected from the group comprising phenol, amine, olefin, and mixtures thereof.

In still further embodiments, the linking group 80 may be may be an organic chain of any chain length that is effective for maintaining the CNTs in a substantially non-agglomerated and substantially uniformly dispersed condition in the fluoropolymer matrix. Altering the chain length of the linking group 80 may be an effective method of modifying mechanical and electrical properties of the coating 10 for particular uses.

The linking group may consist of aromatic groups, saturated and unsaturated groups, linear groups, branched groups, heteroatom groups, and mixtures thereof. Heteroatom groups are sections of the linking group 80 that may contain atoms other than carbon, such as for example oxygen, nitrogen, silicon, halogens, or others, and mixtures thereof. In embodiments, the linking group may be selected from the group consisting of a linear aromatic hydrocarbon group having from about 6 to about 60 carbons, a branched aromatic hydrocarbon group having from about 6 to about 60 carbons, a linear aliphatic hydrocarbon group having from about 1 to about 30 carbons, a branched aliphatic hydrocarbon group having from about 1 to about 30 carbons, a heteroatom, and mixtures thereof. The linking group for embodiments herein is not limited to organic groups. For example, and not to be limiting, the linking group may comprise inorganic chains such as siloxane and phosphazene.

Embodiments of a coating may further comprise an effective fluoropolymer cross-linking agent, bonding agent, curing agent, or cross-linker. Exemplary cross-linkers are bisphenol compounds. An exemplary bisphenol cross-linker may comprise Viton® Curative No. 50 (VC-50) available from E. I. du Pont de Nemours, Inc. VC-50 is soluble in a solvent suspension of the CNT and fluoropolymer and is readily available at the reactive sites for cross-linking. Curative VC-50 contains Bisphenol-AF as a cross-linker and diphenylbenzylphosphonium chloride as an accelerator. Bisphenol-AF is also known as 4,4'-(hexafluoroisopropylidene)diphenol. Effective fluoropolymer cross-linking agents include any compound that is capable of reacting with and cross-linking fluoropolymers.

Figure 5:
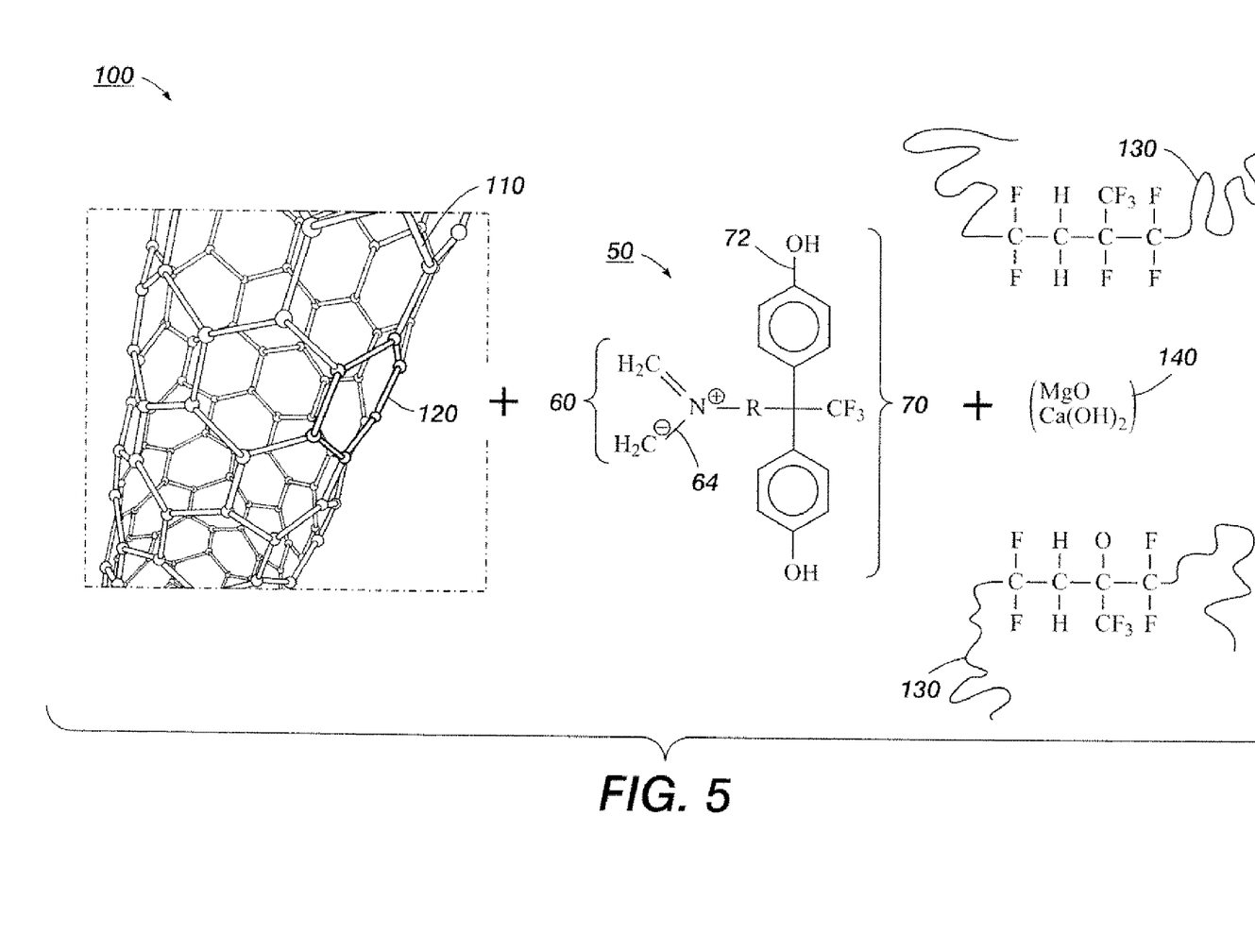
FIG. 5 depicts reactants in an exemplary carbon nanotube/coupling agent/fluoropolymer system.
Figure 6:
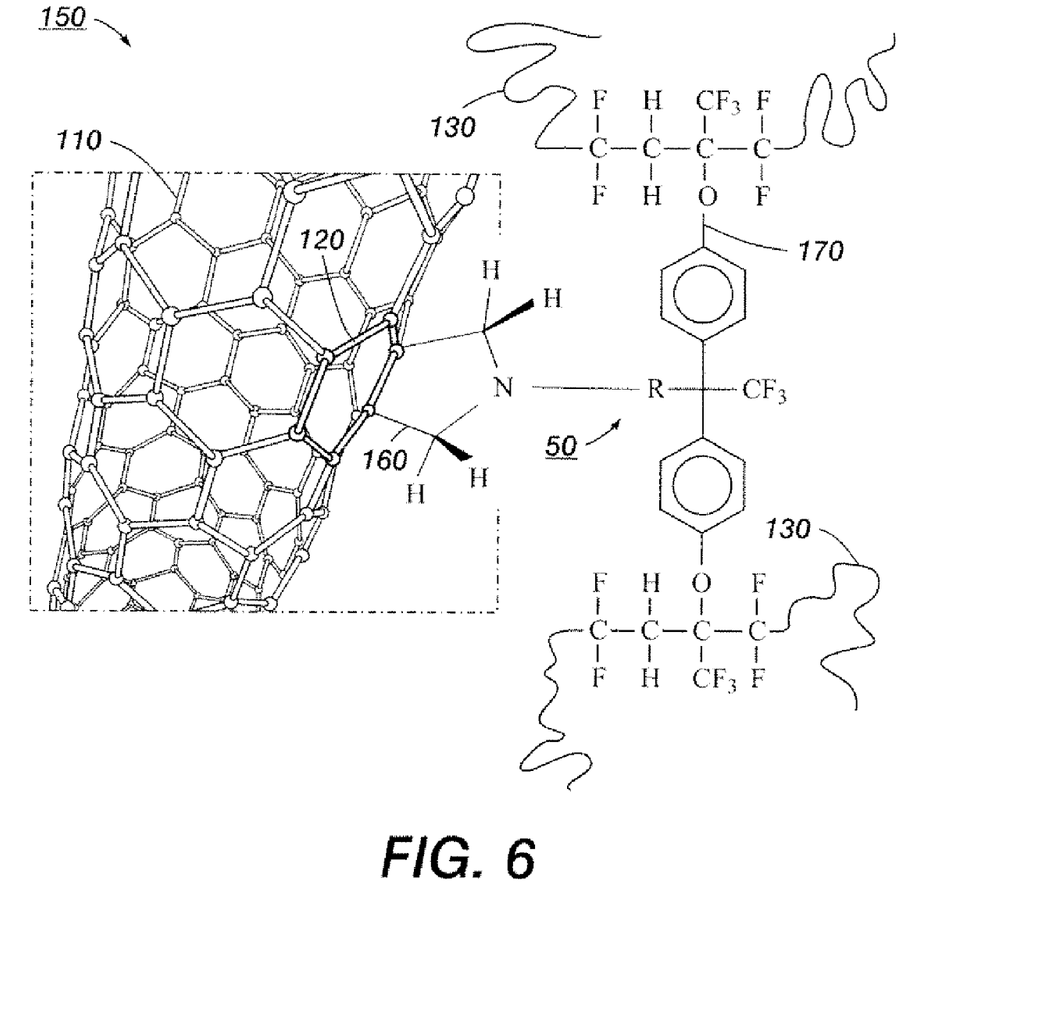
FIG. 6 depicts reaction products in an exemplary carbon nanotube/coupling agent/fluoropolymer system.

While not desiring to be bound to specific reaction mechanisms or theories, a schematic representation of an embodiment of a coupling agent reaction for coatings herein is presented in FIGS. 5 and 6 for illustrative purposes. In FIG. 5, the reactive components 100 in a fluoropolymer/CNT/coupling agent system are presented. An embodiment of a coating herein includes a plurality of carbon nanotubes 110. Carbon nanotubes 110 are usually thought of as one atom thick layers of graphite, called graphene sheets, rolled up into nanometer-sized cylinders or tubes. Perfect graphenes consist exclusively of hexagonal cells 120; pentagonal and heptagonal cells constitute defects. Hexagonal, pentagonal, and heptagonal cells of graphene and carbon nanotubes are all potential reactive sites for embodiments herein.

An exemplary coupling agent 50 is also depicted in FIG. 5, which for example contains an azomethine ylide 64 first functional group 60. In this embodiment, a phenol 72 second functional group 70 is shown for example, and specifically in this non-limiting embodiment, a bisphenol second functional group 70 is depicted.

FIG. 5 also present representations of fluoropolymer chains 130. In an embodiment, dehydrofluorinating agents or acid acceptors 140, in this exemplary instance the basic salts MgO and Ca(OH)$_2$, are also depicted. These agents or basic salts may aid in the reaction of the bisphenol second functional group 70 with the fluoropolymer chains 130.

The reaction product 150 of an embodiment of a coupling agent chemically coupling a CNT and fluoropolymer chains is depicted in FIG. 6. Referring now to both FIGS. 5 and 6, in an embodiment, an azomethine ylide 64 first functional group 60 may react with a portion of a hexagonal ring 120 of a CNT 110 to form CNT/coupling agent bond 160. In the embodiment of FIG. 6 the reaction product of the first functional group 60 may result in a pyrrolidine-type ring bond 160 that chemically couples the CNT 110 to the coupling agent 50.

In the embodiment of FIGS. 5 and 6, the phenolic portions 72 of a second functional group 70 may react with fluoropolymer chains 130. The basic salts 140 may abstract a hydrogen atom from a VF2 monomer, leading to an unsaturated site to which a phenolic 72 portion of a second functional group 70 may add to form a coupling agent/fluoropolymer bond 170, and specifically in the embodiment of FIG. 6, an alkoxybenzene-type linkage 170 that chemically couples the coupling agent 50 to the fluoropolymer chains 130.

In a fashion detailed through the use of the depictions of FIGS. 5 and 6, embodiments of chemically coupling or linking CNT with a fluoropolymer matrix are disclosed. It is emphasized that the reactions shown in FIGS. 5 and 6 are examples of embodiments herein, and are in no fashion to be interpreted as limiting. Any coupling agents or linkers 50 that effectively bond, couple, or link CNTs and fluoropolymers, which are known now or hereinafter to one of ordinary skill in the art, are within scope of embodiments herein.

Figure 7:
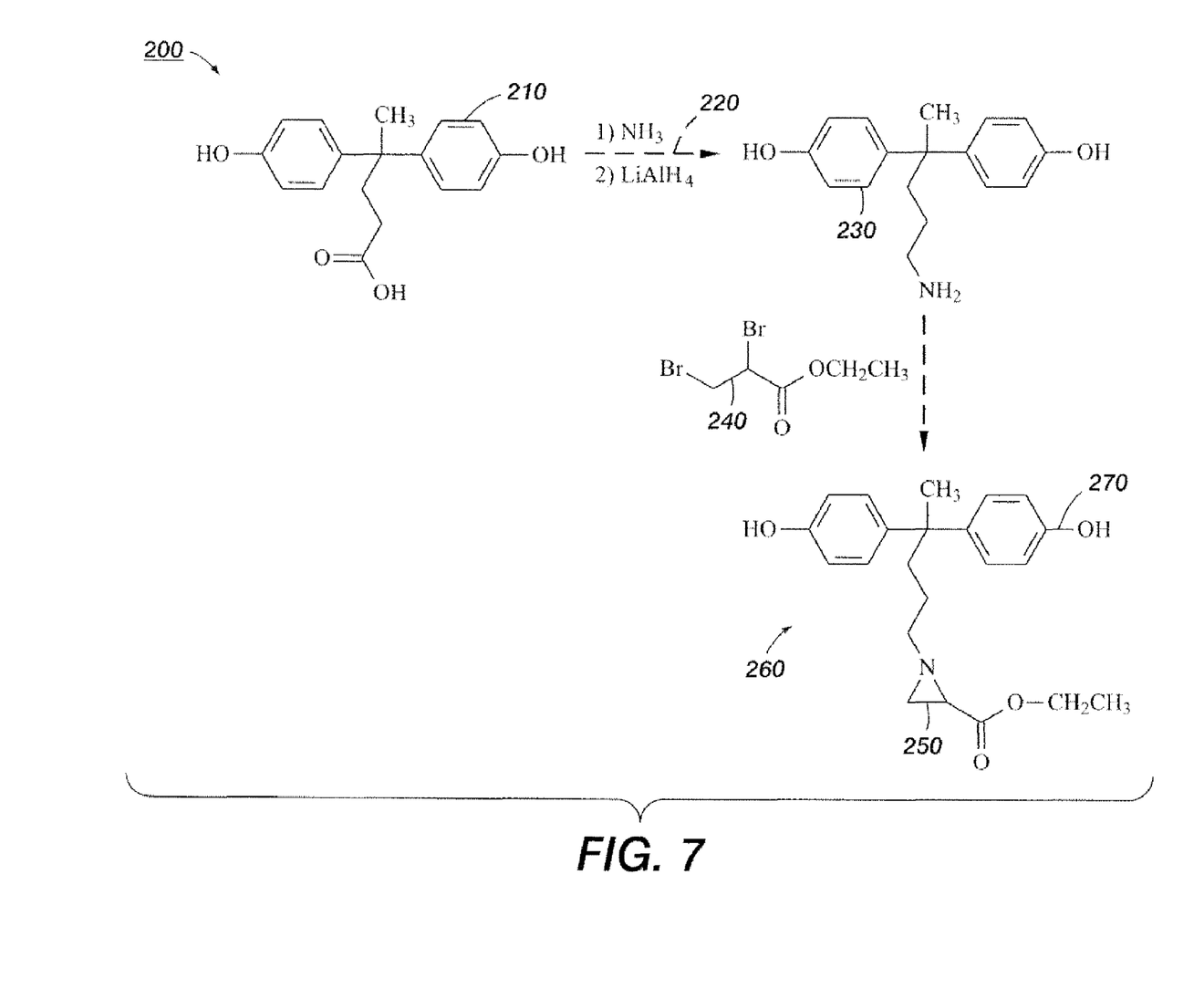
FIG. 7 depicts an exemplary chemical synthesis route to prepare an exemplary coupling agent of embodiments herein.

A chemical synthesis route 200 for an exemplary coupling agent or linker of an embodiment is presented in FIG. 7. Bis(hydroxyphenyl)valeric acid 210 may be reacted with an amine in the presence of LiAlH$_4$ 220 to form an amide (not shown) that may be reduced to an amine 230. The amine 230 may be reacted with ethyl 2,3-dibromopropionate 240 to yield a carboethoxy aziridine functionality 250 that binds carbon nanotubes. This resulting coupling agent 260 would also have the ability to cross-link fluoropolymer chains through the phenolic groups 270 during the curing process, while further strengthening the elastomeric material via bonding to CNTs.

Embodiments of the coating may be employed when the substrate comprises a fuser member, such as but not limited to belts, plates, and cylindrical drums. Fuser members or fixer members may comprise aluminum cylinders or aluminum fuser rolls. Fuser members, as used herein, may comprise any material and configuration that is known now or hereinafter by one of ordinary skill in the art to serve effectively in a fusing capacity.

In embodiments of methods herein, a combination comprising a plurality of carbon nanotubes, at least one fluoropolymer, and a chemical coupling agent is dispersed into an effective solvent to form a stable suspension. During dispersing, reactions between the CNTs, the coupling agent, and the fluoropolymer chains occur, as disclosed and illustrated supra. Effective solvents include, but are not limited to, acetone, methyl isobutyl ketone (MIBK), methyl ethyl ketone (MEK), and mixtures thereof. Other solvents that form stable suspensions, as described herein, are within the scope of the embodiments herein and include those solvents known now or hereafter by one of ordinary skill in the art.

The suspension comprises solubilized polymer that is reacted with a coupling agent, which is in turn reacted with CNTs, resulting in a substantially uniformly dispersed suspension of substantially non-agglomerated CNTs. The suspension has been found to be relatively stable in a substantially uniformly dispersed state for a period of greater than a day.

A suspension is a system in which very small particles (solid, semisolid, or liquid) are more or less uniformly dispersed in a liquid or gaseous medium. If the particles are small enough to pass through filter membranes the system is a colloidal suspension. The term colloids refer to matter when one or more of its dimensions lie in the range between 1 millimicron (nanometer) and 1 micron (micrometer). (*Hawley's Condensed Chemical Dictionary*, 14$^{th}$ Ed, Rev. by R. J. Lewis, Sr., John Wiley & Sons, Inc., New York (2001) pp. 286, 1062).

In embodiments herein, when the CNT/chemical coupling agent/fluoropolymer combination is dispersed into an effective solvent, a suspension is formed. Embodiments of the suspension herein could be considered a colloidal suspension, since they are able to pass through filter membranes. In addition, a solid in liquid colloidal suspension can interchangeably be referred to as a colloidal dispersion (or loosely called a solution). (*Hawley's Condensed Chemical Dictionary*, 14$^{th}$ Ed, Rev. by R. J. Lewis, Sr., John Wiley & Sons, Inc., New York (2001) pp. 415, 1062).

The stability of suspensions of embodiments herein is increased compared with other methods of forming CNT/fluoropolymer suspensions. The stability of a suspension is the tendency for the particles to remain suspended in the solvent and not settle out to the bottom of the container. A major obstacle for use of CNT in prior art coatings has been their tendency for agglomeration. As previously indicated, carbon nanotubes are usually thought of as one atom thick layers of graphite, called graphene sheets rolled up into nanometer-sized cylinders or tubes. CNTs tend to pack into bundles or ropes, at least partially due to strong dispersion interactions between graphene sheets of respective nanotubes. The CNT bundles are not easily dispersed into individual CNTs when mixed into a solvent. The CNT bundles in a solvent settle faster than individually dispersed CNTs. Further, when a suspension of bundled CNTs with fluoropolymers is used for coating a substrate, a non-homogeneous coating is produced on the surface. The non-homogeneous coating with bundled CNTs results in a reduction of mechanical strength of the coating and a reduction in the thermal and electrical conductivity of the coating, as compared with a coating where the CNTs are substantially non-agglomerated and substantially uniformly dispersed.

The suspensions resulting from dispersing a combination of carbon nanotubes, a coupling agent or linker, and at least one fluoropolymer are relatively stable. The reaction of the coupling agents with the CNTs' surfaces may inhibit the CNTs from agglomerating.

In an alternative embodiment, the coupling agent may be reacted with the carbon nanotubes to form grafted carbon nanotubes prior to dispersing the combination of CNTs, coupling agent, and fluoropolymer into an effective solvent.

In still another embodiment, a coupling agent may be reacted with a fluoropolymer to form grafted fluoropolymer prior dispersing the combination into an effective solvent.

In still another embodiment, the combination may be extruded to form a composite prior to dispersing into the effective solvent. The method may include extruding a mixture of carbon nanotubes (CNTs), coupling agent, and a fluoropolymer to form a composite. In an embodiment, the extrusion may be accomplished with a twin screw extruder. An exemplary process may involve the use of a commercially prepared masterbatch of CNT/fluoropolymer material, followed by lowering the concentration of CNT by a letdown extrusion process, where the master batch is co-extruded with a neat fluoropolymer and possibly a coupling agent, so that the CNTs are reacted with the coupling agent, which in turn is reacted with the fluoropolymer, resulting in an extruded composite in which the CNTs are substantially non-agglomerated and substantially uniformly dispersed in a fluoropolymer matrix.

The phrase "non-agglomerated" as used herein is a condition in which the nanotubes or nanoparticles are substantially singly dispersed within the matrix, that is, there are substantially no nanotubes or nanoparticles bundled with other nanotubes or nanoparticles. The phrase "substantially uniformly dispersed" as used herein, is a condition in which the concentration of nanotubes or nanoparticles is substantially the same throughout the matrix.

In an embodiment, grafted carbon nanotubes, that is, CNTs reacted with a coupling agent may be extruded with fluoropolymer prior to dispersing the combination into an effective solvent.

In an embodiment, grafted fluoropolymer, that is, fluoropolymer reacted with a coupling agent may be extruded with CNTs prior to dispersing the combination into an effective solvent.

In a method embodiment, the fluoropolymer may comprises a monomeric repeat unit that is selected from the group consisting of vinylidene fluoride, hexafluoropropylene, tetrafluoroethylene, perfluoro(methyl vinyl ether), and mixtures thereof. In another embodiment, the fluoropolymer is comprised of a poly(vinylidene fluoride), or a copolymer of vinylidene fluoride with another monomer. For example, the fluoropolymer is a copolymer of vinylidene fluoride with another monomer selected from the group consisting of hexafluoropropylene, tetraflouroethyelene, and mixtures thereof.

In still another method embodiment, the carbon nanotubes may be selected from the group consisting of single wall carbon nanotubes, multi-wall carbon nanotubes, carbon nanofibers, and mixtures thereof.

In some embodiments, the chemical coupling agent may comprise at least two effective functional groups selected from the group consisting of carbene, free radical, nitrene, aziridine, azomethine glide, aryl diazonium cation, oxazolidinone, phenol, amine, olefin, and mixtures thereof; and a linking group for chemically linking the effective functional groups. Effective functional groups on a coupling agent are those that couple, bond, or link the CNTs with the fluoropolymer.

In embodiments, the suspension may be coated onto a substrate or onto a fusing member substrate to form a coating. Gap coating can be used to coat a flat substrate, such as a belt or plate, whereas flow coating can be used to coat a cylindrical substrate, such as a drum or fuser roll or fuser member substrate. Various means of coating substrates are familiar to those skilled in the art and need not be elaborated upon herein.

The fusing member of an embodiment may include a metallic substrate, and may further include substrates of aluminum, anodized aluminum, steel, nickel, copper, and mixtures thereof. Other substrate fusing member materials known now or hereafter to one of ordinary skill in the art are within the scope of the embodiments herein. The fusing member substrate may comprise a hollow cylinder, a belt, or a sheet.

After coating, the solvent may be at least partially evaporated. In an exemplary embodiment, the solvent was allowed to evaporate for about two hours or more at room temperature. Other evaporation times and temperatures are within the scope of embodiments herein.

Following evaporation the coating may be cured. An exemplary curing process is a step-wise cure. For example, the coated substrate may be placed in a convection oven at about 149° C. for about 2 hours; the temperature may be increased to about 177° C. and further curing may take place for about 2 hours; the temperature may be increased to about 204° C. and the coating is further cured at that temperature for about 2 hours; lastly, the oven temperature may be increased to about 232° C. and the coating may be cured for another 6 hours. Other curing schedules are possible. Curing schedules known now or hereinafter to those skilled in the art are within the scope of embodiments herein.

In embodiments, a cross-linking agent may be added together with the combination prior to coating or casting. The suspension containing the cross-linker may be mixed briefly, as the cross-linking in solution occurs rapidly. In an embodiment employing cross-linking the suspension, a basic oxide, such as, but not limited to, MgO and $Ca(OH)_2$ may be added to the suspension along with a cross-linking agent.

The thickness of the composite coating after curing may range from about 5 μm to about 100 μm. In other embodiments, a composite coating thickness of about 20 μm to about 50 μm is produced.

Embodiments herein also include a coated fusing member. The coated fusing member of an embodiment may include a metallic substrate, and may further include substrates of aluminum, anodized aluminum, steel, nickel, copper, and mixtures thereof. Other substrate fusing member materials known now or hereafter to one of ordinary skill in the art are within the scope of the embodiments herein. The fusing member substrate may comprise a hollow cylinder, a belt, or a sheet.

A fusing member may also include a fluoropolymer coating as an outermost coating layer on the fusing member substrate. The fluoropolymer may include a monomeric repeat unit that is selected from the group consisting of vinylidene fluoride, hexafluoropropylene, tetrafluoroethylene, perfluoro(methyl vinyl ether), and mixtures thereof. In other embodiments, the fluoropolymer may include a copolymer of vinylidene fluoride with another monomer selected from the group consisting with another monomer selected from the group consisting of hexafluoropropylene, tetrafluoroethyelene, and mixtures thereof. The coated fusing member may include a fluoropolymer that contains more than 60% by weight of fluorine content.

The fluoropolymer coating may comprise a plurality of carbon nanotubes. The carbon nanotubes may be substantially non-agglomerated and substantially uniformly dispersed in the fluoropolymer. In embodiments of a coated fusing member the carbon nanotubes may be selected from the group consisting of single wall carbon nanotubes, carbon nanotubes, carbon nanofibers, and mixtures thereof. In some embodiments of a coated fusing member the carbon nanotubes may have a diameter less than 100 nanometers. In some embodiments the carbon nanotubes are present in an amount of from about 0.5 to about 20 percent by weight of coating composition. In other embodiments of a coated fusing member, the carbon nanotubes are present in an amount of from about 1 to about 10 percent by weight of coating composition.

A coupling agent comprising a first functional group, a second functional group, and a linking group may be present in an exemplary embodiment of a fusing member. The first functional group of the coupling agent may be chemically bonded to the carbon nanotubes; wherein the second functional group may be chemically bonded to the fluropolymer; and wherein the linking group may chemically bond the first functional group to the second functional group. In embodiments of a coated fuser the first functional group may be selected from the group consisting of carbene, free radical, nitrene, aziridine, azomethine ylide, aryl diazonium cation, oxazolidinone, and mixtures thereof. In some embodiments of a coated fuser, the second functional group may be selected from the group consisting of phenol, amine, olefin, and mixtures thereof. Exemplary embodiments of a coated fusing member may include those where the linking group may be selected from the group consisting of a linear aromatic hydrocarbon group having from about 6 to about 60 carbons, a branched aromatic hydrocarbon group having from about 6 to about 60 carbons, a linear aliphatic hydrocarbon group having from about 1 to about 30 carbons, a branched aliphatic hydrocarbon group having from about 1 to about 30 carbons, a heteroatom, and mixtures thereof. Embodiments of a coated fusing member may include a linking group that is a hydrocarbon group containing a siloxane group.

In embodiments, a coated fusing member may include an effective fluoropolymer cross-linking agent, and in some embodiments, the fluoropolymer coating may be crosslinked.

EXAMPLES

A fluoropolymer composite was prepared as follow: 28.83 grams of CNT masterbatch (containing 12 weight % of multi-walled CNT in Viton A, commercially purchased from Hyperion Catalysis International) and 29.17 grams of Viton GF (available from E. I. du Pont de Nemours, Inc.) were heated to about 170° C. and extruded using a twin screw extruder at a rotor speed of 20 revolutions per minute (rpm) for 20 minutes to form about 50 grams of polymer composite containing 5 weight percent of carbon nanotubes.

To form a fuser coating, 41 g of the polymer composite was mixed with 200 of methyl isobutyl ketone for 18 hours. The resulted mixture was sonicated for 15 minutes to form a suspension solution. 0.12 gram of 3-(diethoxymethylsilyl)-propylamine and 0.16 gram of N-(3-diethoxymethyl silyl) propyl 2-carboethoxy aziridine were added into the suspension. Prior to coating, a designated amount (for example, ranging from about 0.5 to about pph) of a curing agent mixture comprised of magnesium oxide, calcium hydroxide, and VC-50 (Viton® Curative No. 50 available from E. I. du Pont de Nemours, Inc.) pre-mixed in methyl isobutyl ketone was added to the coating solution. The resulted dispersion was then coated onto a suitable fuser roll substrate by flow coating technique. The coating was allowed to evaporate most of the solvent, followed by curing at about 170° C. for 2 hours and additional 6 hours at about 200° C. The thickness of the composite coating was about 25 microns after curing. It was speculated that a coupling agent was formed in situ from the hydrolytic condensation of 3-(diethoxymethylsilyl)-propylamine and N-3-diethoxymethyl silyl)propyl 2-carboethoxy aziridine, resulting in a siloxane derivative having a amine group capable of reacting with the fluoropolymer, and a carboethoxy aziridine group capable of reacting with the carbon nanotubes. The dispersion quality of the composite coating was confirmed by TEM image as shown in FIG. 1.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A coated fusing member, comprising:
a fusing member substrate; and
a fluoropolymer coating as an outermost coating layer on the substrate,
wherein the fluoropolymer coating comprises:
a plurality of carbon nanotubes, wherein the carbon nanotubes are substantially non-agglomerated and substantially uniformly dispersed in the fluoropolymer; and
a covalent coupling agent comprising a first functional group, a second functional group, and a linking group joining the first functional group and second functional group;
wherein the first functional group covalently bonds to the carbon nanotubes and is selected from the group consisting of aziridine, oxazolidinone, and mixtures thereof;
wherein the second functional group covalently bonds to the fluoropolymer; and
wherein the linking group covalently bonds the first functional group to the second functional group.

2. The coated fusing member of claim 1, wherein the fluoropolymer comprises a monomeric repeat unit that is selected from the group consisting of vinylidene fluoride, hexafluoropropylene, tetrafluoroethylene, perfluoro(methyl vinyl ether), and mixtures thereof.

3. The coated fusing member of claim 1, wherein the fluoropolymer comprises a copolymer of vinylidene fluoride with another monomer selected from the group consisting with another monomer selected from the group consisting of hexafluoropropylene, tetrafluoromethylene, and mixtures thereof.

4. The coated fusing member of claim 1, wherein the fluoropolymer comprises more than 60% of fluorine content.

5. The coated fusing member of claim 1, wherein the carbon nanotubes are selected from the group consisting of single wall carbon nanotubes, multi-wall carbon nanotubes, carbon nanofibers, and mixtures thereof.

6. The coated fusing member of claim 1, wherein the carbon nanotubes have a diameter less than 100 nanometers.

7. The coated fusing member of claim 1, wherein the carbon nanotubes are present in an amount of from about 0.5 to about 20 percent by weight of coating composition.

8. The coated fusing member of claim 1, wherein the carbon nanotubes are present in an amount of from about 1 to about 10 percent by weight of coating composition.

9. The coated fusing member of claim 1, wherein the linking group is selected from the group consisting of a linear hydrocarbon group having from about 6 to about 60 carbons, a branched aromatic hydrocarbon group haying from about 6 to about 60 carbons, a linear aliphatic hydrocarbon group having from about 1 to about 30 carbons, a branched aliphatic hydrocarbon group having from about 1 to about 30 carbons, a heteroatom, and mixtures thereof.

10. The coated fusing member of claim 1, wherein the linking group is selected from siloxane, phosphazene and combinations thereof.

11. The coated fusing member of claim 1 further comprising an effective fluoropolymer cross-linking agent.

12. The coated fusing member of claim 1, wherein the fluoropolymer coating is crosslinked.

13. The coated fusing member of claim 1, wherein the second functional group is selected from the group consisting of phenol, amine, olefin, and mixtures thereof.

* * * * *